United States Patent

Henzler et al.

[11] Patent Number: 5,803,682
[45] Date of Patent: Sep. 8, 1998

[54] EDGE MILLING DEVICE

[75] Inventors: Roland Henzler, Raidwangen; Helmut Brandstetter, Nürtingen, both of Germany

[73] Assignee: Reich Spezialmaschinen GmbH, Nurtingen, Germany

[21] Appl. No.: 708,754

[22] Filed: Sep. 9, 1996

Related U.S. Application Data

[63] Continuation-in-part of PCT/EP95/00706, Feb. 27, 1995.

[30] Foreign Application Priority Data

Mar. 15, 1994 [DE] Germany ............... 44 08 596.6

[51] Int. Cl.$^6$ ............................................... B23C 3/12
[52] U.S. Cl. ............................................... 409/138
[58] Field of Search .................... 29/33 R, 33 A, 29/564.7; 409/138, 139, 180, 140, 178, 237, 80; 144/142, 139, 154

[56] References Cited

U.S. PATENT DOCUMENTS 5,144,737  9/1992  Riesmeier ..................... 29/564.7

FOREIGN PATENT DOCUMENTS

| 395996 | 4/1990 | European Pat. Off. ............ 409/138 |
| 0 538 513 | 4/1993 | European Pat. Off. . |
| 0 602 308 | 6/1994 | European Pat. Off. . |
| 24 05 837 | 8/1975 | Germany . |

*Primary Examiner*—William R. Briggs
*Attorney, Agent, or Firm*—Cummings & Lockwood

[57] ABSTRACT

In an edge gluing machine, a milling device (6) with a rotating milling tool (9) is provided for shaping the corners (7,8) of the projecting edge bands (14), its pivoting device (11) being arranged on a vertically adjustable housing (15). During the adjustment of the bridge (2) to the respective thickness of workpiece (3), the housing (15) is adjusted vertically by a displacing member (18) and by means of a limit switch (28,29) such that the pivot axis (11') of pivoting device (11) is located in the center of workpiece (3). A linear path control activatable by a light barrier causes the milling tool (9) to be positioned at half the thickness of the workpiece from the leading or trailing narrow surface of workpiece (3). The position of the pivot axis (11') is thereby determined such that a perfect machining of the corners (7,8) is ensured.

12 Claims, 2 Drawing Sheets

EDGE MILLING DEVICE

CROSS-REFERENCE TO RELATED APPLICATIONS

This is a continuation of International Application PCT/EP95/00706, with an international filing date of Feb. 27, 1995 which claims priority to German Patent Application P44 08 596.6 filed Mar. 15, 1994.

The invention relates to an edge gluing machine with a milling device in accordance with the preamble to claim 1.

EP-A-0 395 996 discloses an edge gluing machine provided with a milling device, with which the protruding edge bands can be shaped with a milling tool at the corners of the plate-like workpieces. For this purpose, the milling tool is attached to a pivoting device so as to be radially displaceable, this pivoting device turning for the machining of the corners so that the milling tool moves around the entire corner to be machined.

The object of the present invention is therefore to create an edge gluing, machine of the type specified at the outset, with which the machining of the corners can take place in a simple manner during the passage of the workpieces through the machine. The object is accomplished in accordance with the invention by the features specified in the body of claim 1.

A separate drive motor for the pivoting movement is unnecessary due to the mechanical coupling of the sliding movement of the slide with the pivoting movement of the pivoting device.

The milling device in a preferred embodiment can, for example be mounted with a slide on guide members for displacement parallel to the direction of conveyance of the workpiece so that the machining of the corners takes place during the passage of the workpiece through the machine. In this respect the slide can be displaced with a drive motor such that first of all the slide is moved synchronously to the movement of the workpiece during the first half of the sliding movement of the slide the milling tool thereby machining the leading corner of the workpiece. If the trailing corner reaches the milling tool remaining in the center of the guide members the slide is then moved synchronously to the workpiece again and the milling tool machines the trailing corner of the workpiece. Subsequently an accelerated return of the slide takes place.

In an additional embodiment the slide can also be displaced over the entire length of the guide members for machining the leading corner. Subsequently an accelerated return takes place and then a machining of the trailing corner again over the entire length of the guide members during a sliding movement of the slide synchronously with the workpiece.

Apart from the machining of the corners of the workpiece, it is also possible with the inventive milling device to machine the entire longitudinal edges of the workpiece during its passage through the machine.

For the sliding movement of the slide, the drive motor is preferably operated via a frequency converter such that a continuous control is possible via a rotary path indicator and an adjustable return speed. It is also possible to displace the slide with an actuating cylinder operated by compressed air. Instead of compressed air, the various actuating cylinders can also be operated with pressure oil.

To carry out the pivoting movement of the pivoting device, a drive member in the form of, for examplem, a drive chain can be provided which is connected to the base frame with its free ends and winds partially around a drive wheel for the pivoting device. This means that the turning movement of the pivoting device is automatically carried out via the sliding movement of the slide and a reliable and uniform turning of the pivoting device at different speeds is ensured.

So that the corner is shaped properly, it is important for the axis of the pivoting device to be adjusted such that it is located inside the region of the workpiece adjacent the leading or trailing narrow surface, preferably in its center and removed from the narrow surface by half the thickness of the workpiece.

This adjusting occurs manually in the known manner which, in an edge gluing machine with continuous machining of the workpieces, represents additional expenditure of energy and interrupts the flow of work.

The adjustment of the pivoting device-and with it of the milling tool-to various workpiece thicknesses in an automatic manner is preferably accomplished by means of displacing members for the vertical displacement which can be controlled from a bridge which, itself, is arranged on the base frame so as to be vertically displaceable.

In an advantageous embodiment of the invention, the adjustment of the housing with pivoting device is carried out via compressed air cylinders which engage on the housing and can be controlled from limit switches connected to the bridge. As is well known, this bridge is displaced in relation to the base frame via drive means actuatable by hand for the adjustment to a specific workpiece thickness, whereby the adjustment of the milling device is also carried out at the same time. This control can either take place in a continuous manner but it is also possible to carry out the vertical adjustment of the housing in four vertical steps which are adapted to the workpiece thickness.

To adjust the distance of the pivot axis from the narrow surfaces of the workpiece, sensors and control devices, which adjust this distance to the workpiece thickness, can again be provided.

For the vertical displacement of the housing with pivoting device, an electromotor which is again controllable from limit switches and drives a spindle interacting with the housing can also be provided. It is likewise possible to displace the housing into the desired position with a lever which is connected to the bridge.

In the following, one embodiment of the invention will be described in greater detail with reference to the drawings.

Figure 1:
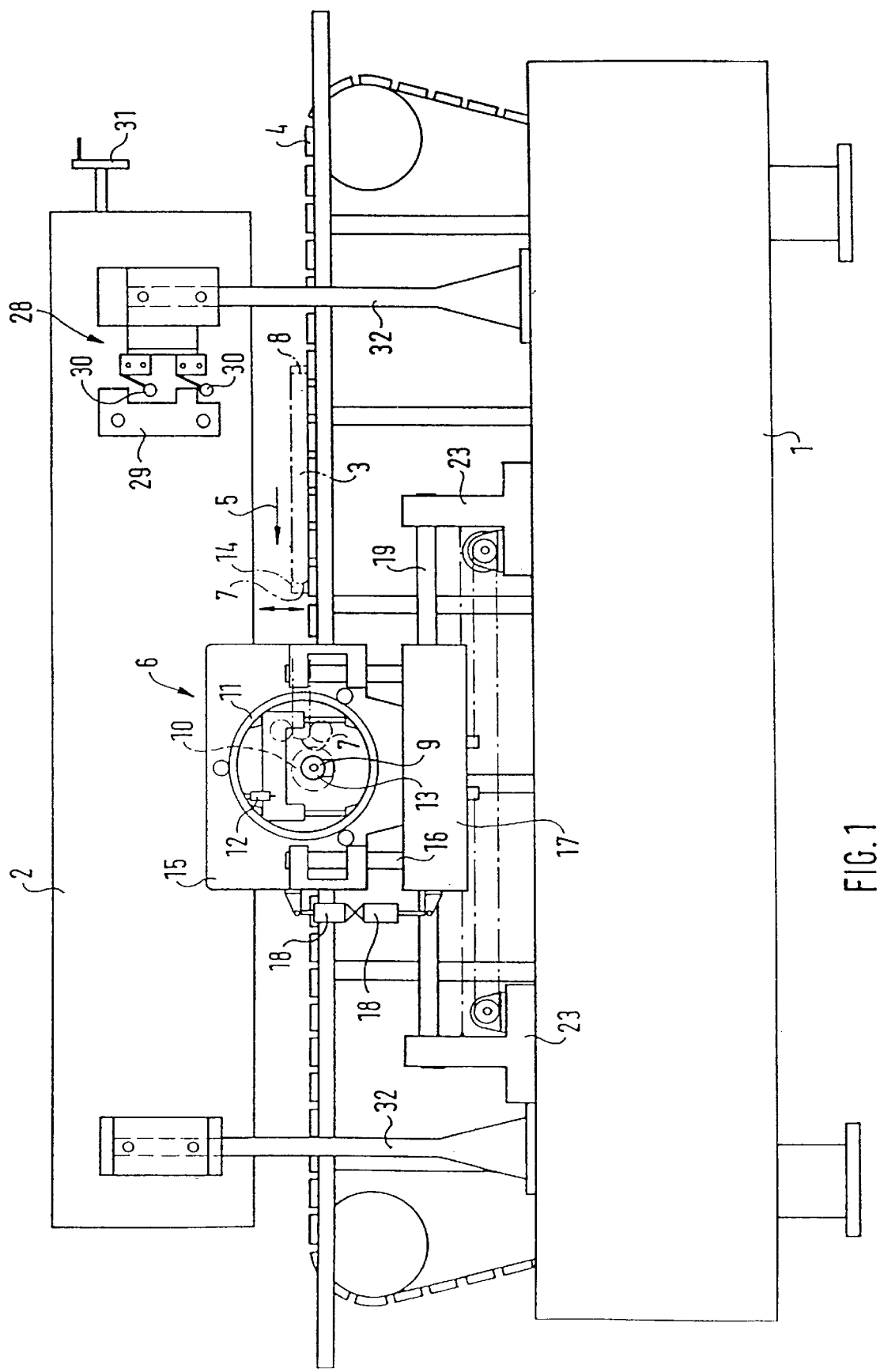
FIG. 1 shows an edge gluing machine with a milling device, from the side

The edge gluing machine illustrated in FIG. 1 consists in a known manner of a base frame 1, on which a bridge 2 is mounted for vertical displacement.

The workpiece 3 is moved by means of a conveyor chain 4 in the direction of arrow 5, the various operating procedures such as gluing on the edge band, milling the edges and corners, cutting and abrading taking place during the feed movement. For the sake of clarity, only the milling device 6 is illustrated in FIG. 1.

A milling tool 9 serves to machine the corners 7 and 8 of workpiece 3, this milling tool being mounted in a known manner with the milling motor 10 so as to be radially displaceable on a pivoting device 11. It is thereby pressed with a compressed air cylinder 12 in the direction of workpiece 3 until a feeler roll 13 concentric to the milling tool 9 abuts on the workpiece 3.

Figure 2:
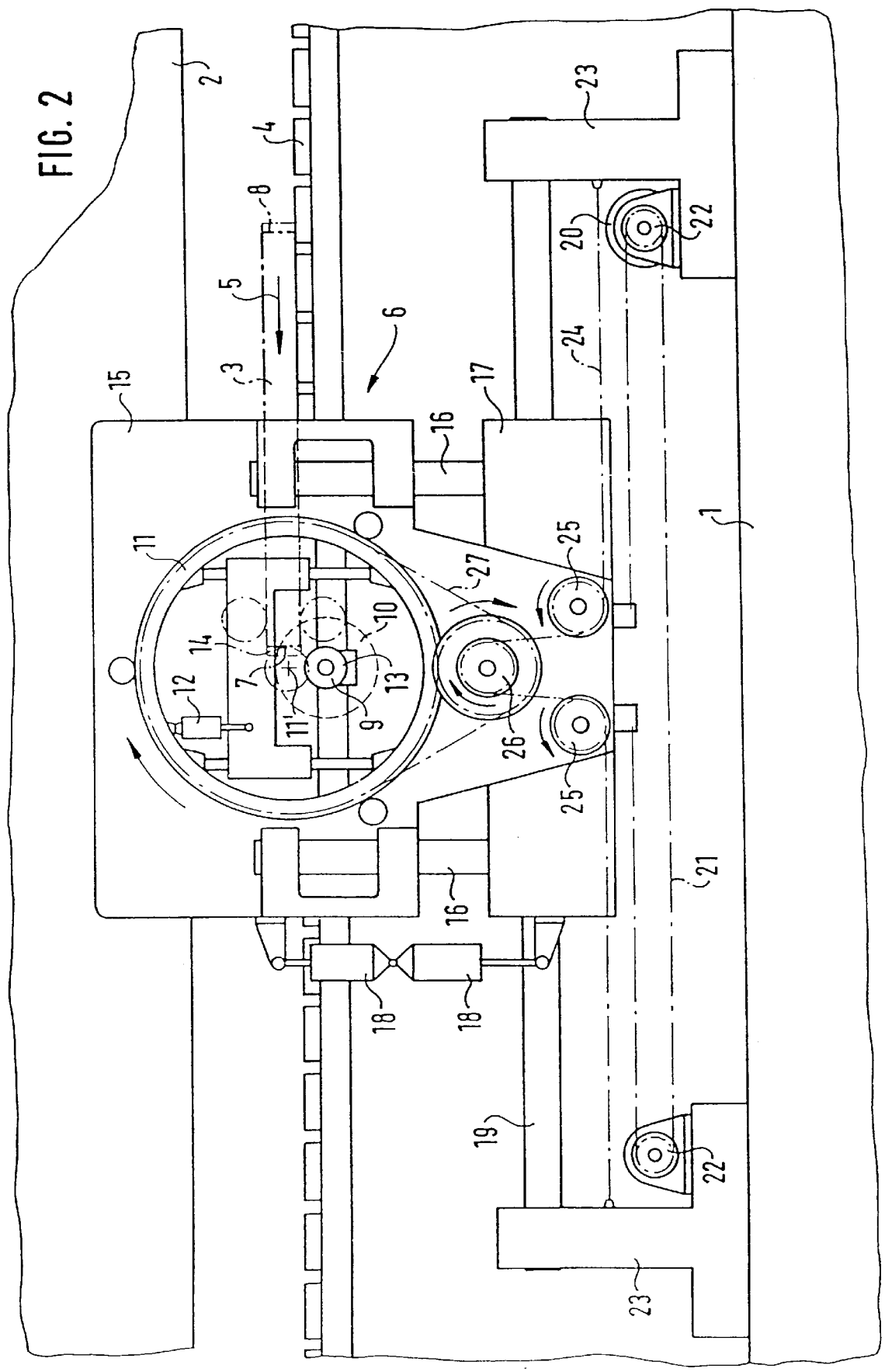
FIG. 2 shows a milling device enlarged, from the side

During the pivoting movement of pivoting device 11 about a pivot axis 11' the milling tool 9, as indicated in FIG. 2 by dash-dot lines, travels around the corner 7 and mills the edge band 14 off in accordance with the shape of the corners 7 and 8, respectively.

The pivoting device 11 is pivotally mounted on a housing 15, the housing 15 being mounted on guide bars 16 on a slide 17 for vertical displacement. Compressed air cylinders 18 serve to displace housing 15, these cylinders being connected, on the one hand, with the slide 17 and, on the other hand, engaging on the housing 15.

The slide 17 is mounted on guide members 19 connected to the base frame 1 for displacement parallel to the direction of conveyance 5. It is movable by a drive motor 20 via a drive chain 21 which is arranged between deflecting rollers 22 on the pedestals 23 and the free ends of which are connected with the slide 17 (FIG. 2).

A drive member 24 serves to drive the pivotal movement of pivoting device 11, the free ends of this drive member being connected to the pedestals 23 and the drive member leading via deflecting rollers 25 to a drive wheel 26 and winding partially around it. From this drive wheel 26 an additional drive member 27 in the form of a chain leads to the pivoting device 11 which likewise has the chain partially winding around it and is thus drivable by the drive wheel 26.

As shown in FIG. 1, a limit switch 28 connected to the base frame 1 serves to control the displacing members 18, with switching elements 30 and a switching plate 29 rigidly connected to the bridge 2. The two switching elements 30 are activated depending on the relative position between limit switch 28 and switching plate 29 and effect the adjusting of housing 15 by actuating the displacing members 18.

A handwheel 31 serves to adjust the bridge 2 mounted for displacement on the columns 32, the adjustment of the milling device 6 to the present workpiece thickness taking place at the same time.

When the workpiece 3 runs into the machine, this activates via a light barrier which is not illustrated a linear path control which determines the point of engagement of the milling tool 9 on the workpiece 3 and, therefore, the distance of the pivot axis 11' of pivoting device 11 from the leading and trailing narrow surface, respectively, via an electronic connection such that the pivot axis 11' is removed from the narrow surface by half the thickness of the workpiece.

If the workpiece 3 reaches the area of the milling tool 9 located in the lower rest position, this is then guided against the workpiece 3 by feeler roll 13 by means of the compressed air cylinder 12. At the same time, the drive motor 20 causes the slide 17 to move synchronously to the conveyor chain 4. The milling tool 9 moving along with the workpiece 3 travels around the corner 7 and thereby reaches the center between the two pedestals 23, the milling procedure thereby being completed and the milling tool 9 lifted away from the workpiece 3.

The milling tool 9 remains in this position while the workpiece 3 continues to move on the conveyor chain 4 for such a time until the trailing corner 8 reaches the area of milling tool 9. This is again moved in the direction of workpiece 3 and travels around the trailing edge 8, the slide 17 being displaced over the left half of the guide members 19.

After traveling completely around corner 8, milling tool 9 is lifted away from workpiece 3 and the slide 17 is returned to its initial position with increased speed.

The pivoting movement of pivoting device 11 takes place during the sliding movement of slide 17 via the drive member 24 in the manner already described.

We claim:

1. Apparatus for machining corners of plate-like workpieces comprising: a base frame, a conveyor device associated with said base frame and arranged for the transport of plate-like workpieces to be machined, a milling device for machining corners of the workpieces, said milling device including a milling tool held on a pivoting device so as to be drivable, said milling tool being pivotable by means of said pivoting device about an axis arranged parallel to the plane of conveyance of the workpieces and at right angles to the direction of conveyance of the workpieces, said milling device being mounted for displacement parallel to the direction of conveyance of the workpieces, and a drive motor for facilitating displacement of said milling device said drive motor being operatively connected to a synchronizing member for synchronizing the displacement movement of said milling device with the speed of conveyance of the workpieces, and wherein pivoting movement of said pivoting device is mechanically coupled to the displacement movement of said milling device.

2. Apparatus as defined in claim 1, wherein said milling device is arranged on a slide mounted on guide members for displacement parallel to the direction of conveyance of the workpieces.

3. Apparatus as defined in claim 1, wherein said drive motor is provided for moving said milling device synchronously to a conveyor chain of the conveying device during a working stroke.

4. Apparatus as defined in claim 1, wherein by means of said drive motor said milling device executes a first displacement movement during the machining of a leading corner of said workpiece and during the machining of a trailing corner of said workpiece, said milling device executes a second displacement movement following on from said first displacement movement.

5. Apparatus as defined in claim 4, wherein by means of said drive motor said milling device is returned after the machining of said leading corner and prior to the machining of said trailing corner.

6. Apparatus as defined in claim 1, wherein a drive member is connected to the base frame for carrying out the pivoting movement of the pivoting device, said drive member interacts with a drive wheel to effectuate the pivoting movement of the pivoting device.

7. Apparatus as defined in claim 6, wherein said drive member comprises a conveyor chain having free ends connected to the base frame, and said conveyor chain winds partially around the drive wheel.

8. Apparatus as defined in claim 1, wherein said machine further includes a bridge arranged on said base frame, said bridge and said milling device being vertically displaceable, and a displacing member for effectuating the vertical displacement of said pivoting device, said displacing member being controllable from the bridge.

9. Apparatus as defined in claim 8, wherein said displacing member comprises an actuating cylinder.

10. Apparatus as defined in claim 8, wherein said displacing member comprises an electromotor for driving a spindle interacting with said pivoting device.

11. Apparatus as defined in claim 8, wherein a limit switch is connected to said base frame for controlling vertical adjustment of said pivoting device, said switch being actuatable by a switching plate connected to said bridge.

12. Apparatus as defined in claim 1, wherein said pivoting device is vertically adjustable such that the pivot axis thereof is located essentially in the center of the workpiece to be machined, and a linear path control activatable by a sensor is provided for determining the point of engagement of said milling tool on the workpiece.

* * * * *